US008244965B2

(12) United States Patent
Huang

(10) Patent No.: US 8,244,965 B2
(45) Date of Patent: Aug. 14, 2012

(54) CONTROL METHOD FOR LOGICAL STRIPS BASED ON MULTI-CHANNEL SOLID-STATE NON-VOLATILE STORAGE DEVICE

(75) Inventor: He Huang, Shenzhen (CN)

(73) Assignee: Memoright Memoritech (Wuhan) Co., Ltd., Wuhan (CN)

( * ) Notice: Subject to any disclaimer, the term of this patent is extended or adjusted under 35 U.S.C. 154(b) by 261 days.

(21) Appl. No.: 12/648,167

(22) Filed: Dec. 28, 2009

(65) Prior Publication Data

US 2010/0100668 A1 Apr. 22, 2010

Related U.S. Application Data

(63) Continuation-in-part of application No. PCT/CN2008/071188, filed on Jun. 4, 2008.

(30) Foreign Application Priority Data

Jun. 28, 2007 (CN) .......................... 2007 1 0076248

(51) Int. Cl.
*G06F 12/00* (2006.01)

(52) U.S. Cl. ................. 711/103; 711/114; 711/E12.016

(58) Field of Classification Search ........................ None
See application file for complete search history.

(56) References Cited

U.S. PATENT DOCUMENTS

| 6,347,359 | B1 * | 2/2002 | Smith et al. | 711/114 |
|---|---|---|---|---|
| 6,898,668 | B2 * | 5/2005 | Thompson et al. | 711/114 |
| 7,296,135 | B2 * | 11/2007 | Thompson | 711/201 |
| 2006/0277361 | A1 | 12/2006 | Sharma et al. | |
| 2007/0115731 | A1 | 5/2007 | Hung | |

FOREIGN PATENT DOCUMENTS

| CN | 1790308 A | 6/2006 |
|---|---|---|
| CN | 101101569 A | 1/2008 |
| CN | 101101570 A | 1/2008 |

OTHER PUBLICATIONS

Matt Woodward, "Two Flash Drives in A RAID-0 Array", 2005, pp. 1-3, http://arstechnica.com/hardware/reviews/2005/04/flash2005.ars/10.*
Advanced Computers & Network Corporation, "Raid 0+1: High Data Transfer Performance", Jan. 24, 2001, p. 1, http://web.archive.org/web/200101240753/http://www.acnc.com/04_01_0p1.html.*
PC Guide, "RAID Levels 0+1 (01) And 1+0 (10)", Apr. 17, 2001, pp. 1-2, http://www.pcguide.com/ref/hdd/perf/raid/levels/multLevel01-c.html.*
Jeong-UK Kang et al., "A Multi-CHannel Architecture For High-Performance NAND FLash-Based Storage System", Journal of Systems Architecture 53, Feb. 1, 2007, pp. 644-658.*

\* cited by examiner

*Primary Examiner* — Edward Dudek, Jr.
*Assistant Examiner* — Christopher Birkhimer
(74) *Attorney, Agent, or Firm* — Seed IP Law Group PLLC

(57) ABSTRACT

A control method for logical strips based on a multi-channel solid-state non-volatile storage device is provided. The method includes the following processing steps. In Step 1, a storage space of every channel is partitioned into a plurality of storage units of equal size. In Step 2, at least one logical strip is set by which the storage units with discrete physical addresses across a plurality of channels are organized into a continuous logical space. In Step 3, during data reading/writing operation, the data is divided according to a size of each local strip, the divided data is mapped to the storage units of every channel, and a parallel reading/writing operation is performed across the channels. This method may increase the efficiency of reading and writing operations of the storage device and prolong the operating life span of the device.

8 Claims, 4 Drawing Sheets

CONTROL METHOD FOR LOGICAL STRIPS BASED ON MULTI-CHANNEL SOLID-STATE NON-VOLATILE STORAGE DEVICE

CROSS REFERENCE TO RELATED APPLICATION

This is a continuation-in-part application of PCT/CN2008/071188 filed on Jun. 4, 2008 which claims priority from Chinese Patent Application No. 200710076248.6 filed on Jun. 28, 2007.

BACKGROUND

1. Technical Field

The present disclosure relates to a logical space organization method of a solid-state non-volatile storage device, and more particularly to a control method for logical strips based on a multi-channel solid-state non-volatile storage device.

2. Description of the Related Art

Hard disks are holding a dominant position in the field of storage devices. At present, solid-state non-volatile storage devices using semiconductor as storage medium, for example, flash memory storage devices gradually prevail. Characteristics of the non-volatile storage devices are illustrated below with a flash memory as an example. The flash memory has emerged suddenly in the storage market and had a rapidly rising market share because it may perform reading/writing and erasing many times and has the characteristics of high density, large capacity, low time consumption in reading and writing operations, non-volatility, and low power consumption. Especially in recent years, the increasingly mature production process, the gradually reduced cost price, and increasingly perfect back-end application technology of the flash memory have all greatly stimulated the flash memory market to a rapid expansion and made the flash memory gradually have equal shares with the hard disk in the storage market. However, due to problems in the manufacturing process, the flash memory has had some unavoidable defects since it came into being. For example, flash memory chips normally perform the reading and writing operations in a unit of a sector, and an effective bandwidth of the reading and writing timing of each flash memory chip is no more than 40 MB. These defects have become obstacles to the rapid development of the flash memory. During the application of the flash memory, the flash memory medium can be utilized well only after eliminating the obstacles.

Along with the gradual improvement of the flash memory application technology, users require for increased reading and writing rates of the flash memory device. A read/write rate of an interface of a single-chip or single-channel flash memory device has already been far from satisfying the users' demands. Therefore, almost all the manufacturers of flash memory devices and flash memory controllers are researching and developing an operation mode of multi-channel flash memory chips. Such multi-channel flash memory device may perform flash memory operation on a plurality of channels simultaneously, so that the read/write rate of the interface of the flash memory device can be multiplied.

For such kind of multi-channel flash memory device, since the device normally executes instructions of a host and performs reading, writing, and erasing operations in parallel by the plurality of channels simultaneously, a problem of how to organize the read or written data and a problem of how to organize discrete physical storage spaces in the plurality of channels are inevitably to be faced, which, however, have not been well solved yet in the existing technologies.

BRIEF SUMMARY OF THE DISCLOSURE

Based on a concept of logical strips of a solid-state non-volatile storage device and processing manner of designing a size of the logical strip by users according to the demands, one embodiment of the present disclosure is directed to provide a control method for logical strips based on a multi-channel solid-state non-volatile storage device, for increasing the reading and writing efficiencies and operating life span of a flash memory device by setting a size of logical blocks by users.

The control method for logical strips based on a multi-channel solid-state non-volatile storage device according to one embodiment of the present disclosure includes the following processing steps:

Step 1: dividing a storage space of each of a plurality of channels into a plurality of storage units of equal size;

Step 2: setting at least one logical strip by which the storage units with discrete physical addresses across the plurality of channels are organized into a continuous logical space; and Step 3: during data interaction, dividing the data according to a size of each logical strip, mapping the divided data to the storage units of every channel, and performing reading/writing operations in parallel among the plurality of channels.

Step 2 may further include setting a logical strip variable, wherein the logical strip variable corresponds to a number of storage units in each channel which logically connected in a logical strip, or corresponds to the size of each logical strip.

Each storage unit may correspond to a logical strip variable.

The storage unit may be a sector, a page, or a byte.

When the storage unit may be a page, the method may further include storing the logical strip variable in a redundant information area.

The solid-state non-volatile storage device may include a flash memory device.

The logical strip variable may be collectively stored in a designated position of a reserved information area of the storage device.

The logical strip variable may be divided into a plurality of ranks from large to small according to a value of the logical strip variable, and the size of each logical strip may be adjusted by changing a rank of the logical strip variable, in which a) when the storage device performs a data writing operation frequently, the logical strip variable is selected to be a rank of a large value;

b) when the storage device performs a data reading operation frequently, the logical strip variable is selected to be a rank of a small value; and c) when the storage device performs data reading and writing operations with substantially equal frequency, the logical strip variable is selected to be an intermediate rank.

When the logical strip variable of a logical strip is to be adjusted, the method may further include performing a backup for the existing data stored in the storage device.

Before Step 1, the method may further include dividing the storage device into a plurality of logical partitions, and performing a reading/writing control on each logical partition according to Steps 1, 2, and 3.

By using the control method for logical strips based on a multi-channel solid-state non-volatile storage device, since a concept of logical strips is provided for the multi-channel solid-state non-volatile storage device with a controllable and variable setting of the logical strips, and the user can set the logical strips according to demands, the device can be better adapted to different user groups, so as to achieve the effects of increasing the efficiency of reading and writing operations of the flash memory and prolonging the operating life span of the flash memory.

BRIEF DESCRIPTION OF THE SEVERAL VIEWS OF THE DRAWINGS

The present disclosure will become more fully understood from the detailed description given herein below for illustration only, and thus are not limitative of the present disclosure, and wherein.

DETAIL DESCRIPTION DISCLOSURE

A core of the present disclosure is to provide a concept of logical strips for the parallel access technology of the existing multi-channel solid-state non-volatile storage device and enable the storage device to be applied in various application environments by setting a size of a logical strip variable, so as to increase the reading and writing efficiencies of the storage device and prolong the operating life span.

The present disclosure is illustrated in detail below through the accompanying drawings in combination with particular embodiments.

Figure 2:
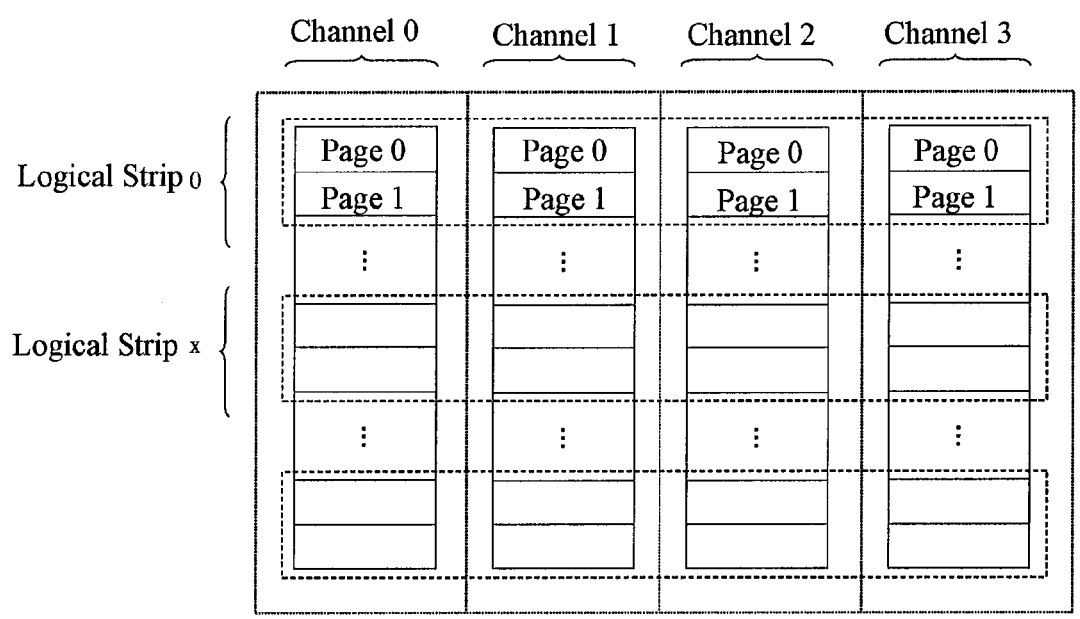
FIG. 2 is a schematic view illustrating logical blocks of a multi-channel flash memory storage device of the present disclosure.

The concept of the logical strips is introduced first. Take a flash memory device as an example, as shown in FIG. 2, the storage medium in the flash memory device is divided into storage units (i.e., pages). A logical strip is comprised of a plurality of storage units in n channels in the device, wherein each channel has m storage units (in the figure, n is 4 and m is 2). Each page is a small storage unit. All the logical strips are connected to form a continuous logical storage space, i.e., the storage space of the flash memory device seen by a user. During the usage, the logical strip functions as a standard container which represents a size of an object that the storage device can process at a time.

However, during the usage, some problems gradually occur in such organization method. The flash memory device is used by various users, and different users have different purposes. For example, some users mainly use it for storing or frequently writing data. If each of the logical strips is relatively small so that flash memory chips of a plurality of channels are enabled for each writing operation, when data exists in a page with a destination address, effective data in a block including the page be backed up first, the block is then erased, and the effective data along with the data of this operation is written. Therefore, for the writing process, the smaller a logical strip is, the more blocks to be erased are, which needs more operation time and causes more consumption to the flash memory device. If each of the logical strips is relatively large so that one writing operation falls within one channel as much as possible, a block including a page with a destination address may only need to perform one erasing operation to realize this writing operation, which saves the time for writing to a large extent and effectively reduces the consumption to the flash memory device.

For another example, if some users use the flash memory device only for backup of documents of relatively small data, the documents are read frequently during the usage. In such case, if each of the logical strips is relatively large so that data are written into pages in only one channel in previous writing operations, only the one channel is enabled during a read operation, which fails to achieve the purpose of parallel operation and greatly reduces a reading rate of an interface of the device. If a logical strip is capable of being relatively small, the data will be distributed in a plurality of channels which will be simultaneously enabled during the read operation, and thus the reading rate of the interface of the device is multiplied.

It can be seen from the above that a relatively appropriate setting of a size for a logical strip has great influence on the flash memory device. Therefore, if a processing manner of fixing the size of a logical strip is employed, when the device is used by users having different purposes, since the size of the logical strip is fixed, its reading and writing efficiencies during the usage as well as the life span will be greatly influenced. Therefore, how to effectively set the logical strips and reasonably control the logical strips according to the users' demands has become an important factor influencing the reading and writing efficiencies and operating life span of the flash memory device.

Figure 1:
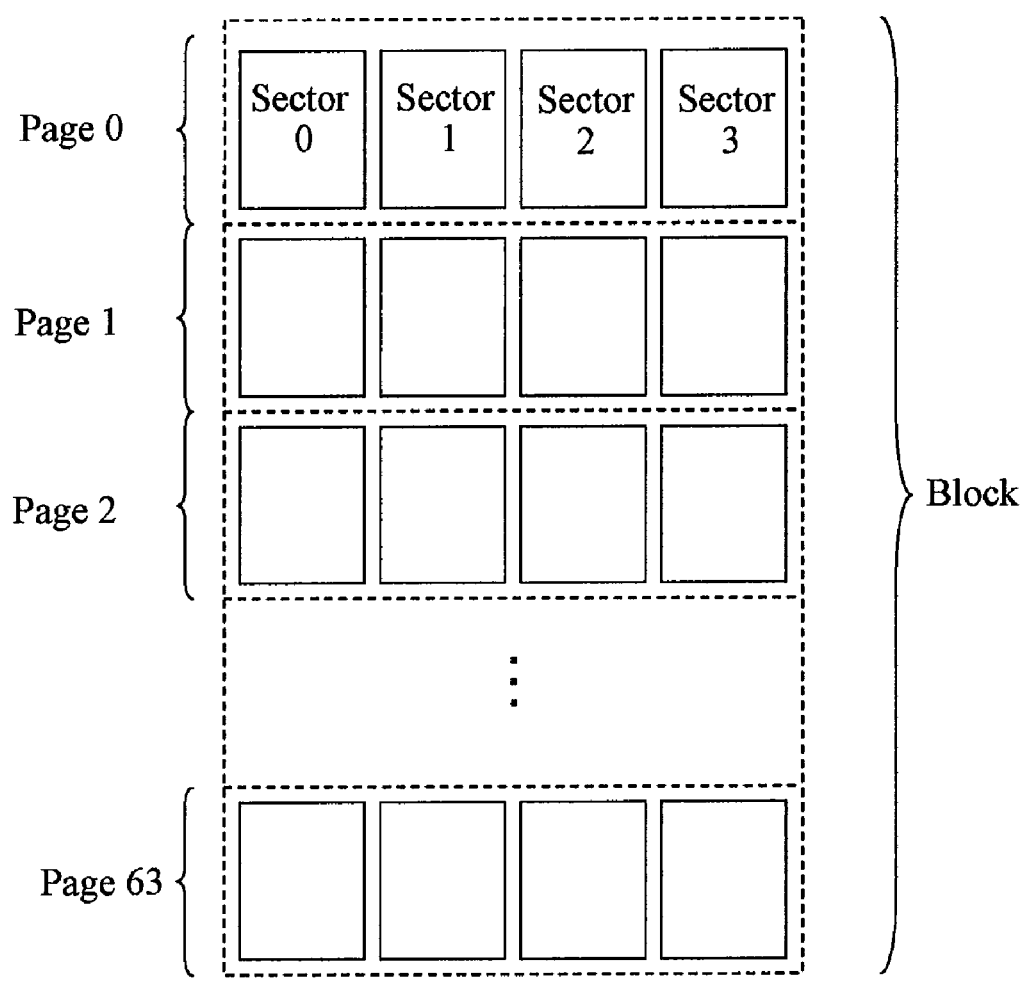
FIG. 1 is a schematic view illustrating a physical block of a flash memory device.

Currently, a general method for dividing flash memory chips is as follows. A sector has 528 bytes (1 byte contains 8 bits) including an effective data area of 512 bytes and a redundant area of 16 bytes. Then, 4 sectors form a page, and 64 pages form a physical block, as shown in FIG. 1. For the multi-channel flash memory device, as shown in FIG. 2, m pages of each of n channels form a logical strip across the n channels, wherein n is a fixed value and represents the number of the channels of the device, and the value of m is determined by a strategy of the device. A storage unit can also be a sector or a byte.

By using the logical strip, firmware can organize storage units which in this embodiment are physical pages. Since the multi-channel flash memory device performs operations by a plurality of channels simultaneously, the written or read data is inevitably in different flash memory chips, resulting in a discontinuous distribution of physical space. However, for mapping and organization, logical space is generally continuous. In other words, it is the logical strip that organizes the discontinuous physical pages into a continuous logical space.

FIG. 1 is a schematic view illustrating a physical block of a flash memory device. Each block of the flash memory device includes 64 pages each including 4 sectors. Each sector has 528 bytes, including an effective data area of 512 bytes and a redundant area of 16 bytes.

FIG. 2 shows logical strips of a multi-channel flash memory storage device. As exemplified in the figure, the number of channels, n, is 4, and the number of pages of each channel in a logical strip, m, is 2. Therefore, each of the logical strips, such as a starting logical strip 0 and a logical strip X shown in the figure, of the multi-channel flash memory device has a size of 16 KB as shown in this example.

A page is used as a storage unit of a logical block of a flash memory device in this embodiment, and each page correspondingly has a logical strip variable. The logical strip variable corresponding to each page may be stored in a redundant information area of each sector of each page in a scattered manner, or may be collectively stored in a designated position of a reserved information area of the flash memory device.

In addition, when a size of a logical space of a logical strip is adjusted, the existing data stored in the flash memory device still need be backed up. An automatic backup by software may be employed. Alternatively, a user having been notified by a human-machine interface may perform the backup first before the size is adjusted.

When the flash memory device includes a plurality of logical partitions, each of the different logical partitions has a different size of a logical strip.

Figure 3:
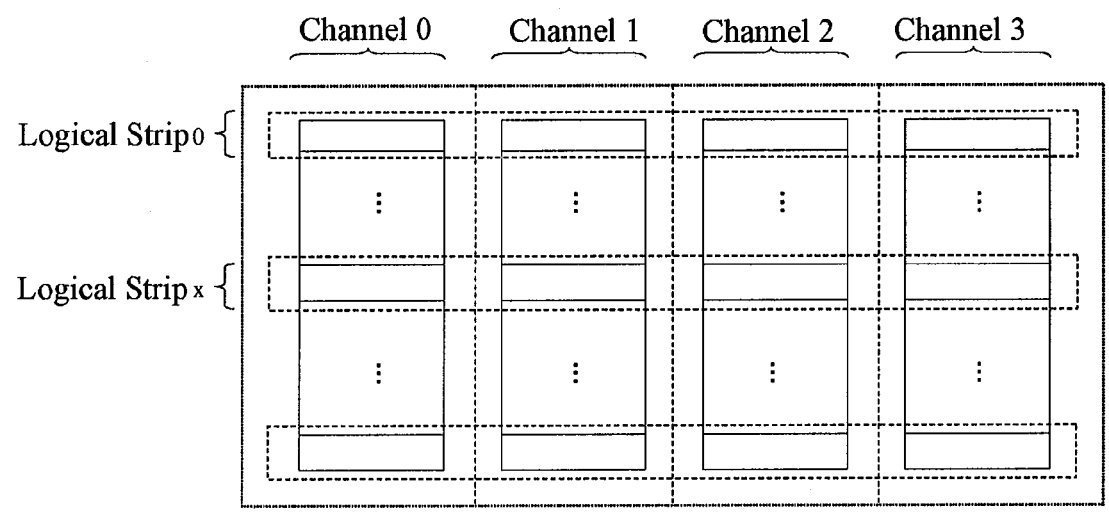
FIG. 3 is a schematic view of small logical strips of a multi-channel flash memory storage device in a preferred embodiment of the present disclosure.

As shown in FIG. 3, when a user intends to frequently perform data reading operation on a flash memory device, to ensure a speed of the reading operation of the flash memory device, each of logical strips is correspondingly adjusted to a size of 8 KB as shown in the figure according to the principle that a logical strip should be set to be as small as possible for a reading operation. Assume that an average size of a data block operated by the user is 8 KB. If each logical strip is set to be relatively large, for example, 32 KB, four channels cannot be enabled simultaneously for each reading operation, so that the speed of the reading operation will be very low. The logical strip can be set by the user according to the embodiment of the present disclosure. If the logical strip is relatively appropriately set to be, for example, 8K, four channels will be enabled simultaneously to perform the reading operation, so that the speed of the reading operation of the storage device will be sufficiently increased and the purpose of parallel reading of the multi-channel flash memory is realized.

Figure 4:
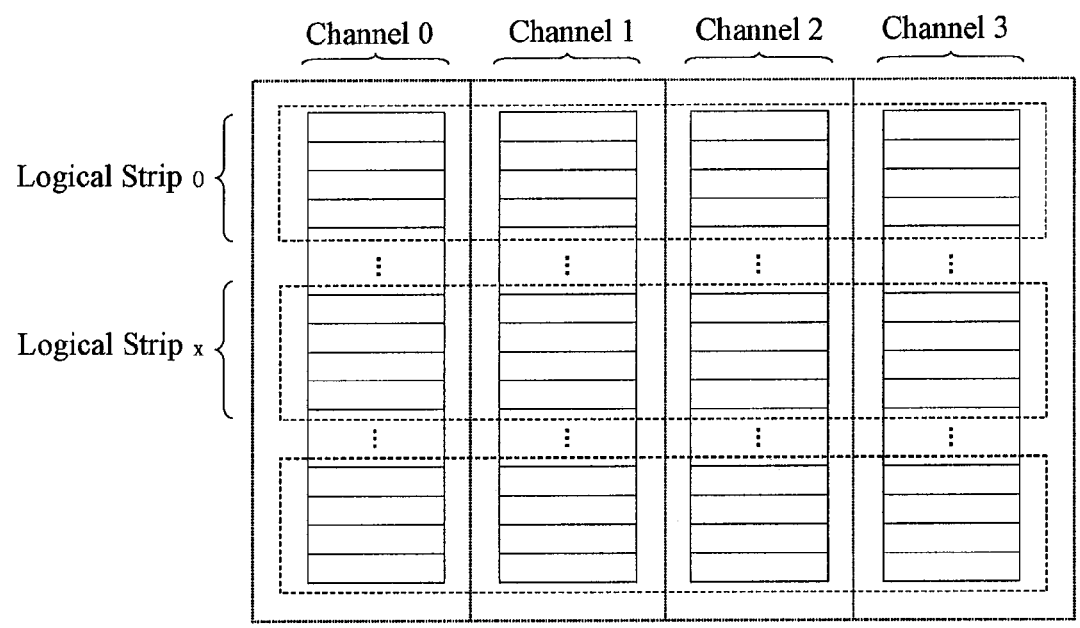
FIG. 4 is a schematic view of large logical strips of a multi-channel flash memory storage device in a preferred embodiment of the present disclosure.

As shown in FIG. 4, when a user intends to frequently perform writing operations many times on the flash memory device, considering the efficiency and interface rate of the flash memory device during the writing operation as well as the consumption of the flash memory chips, each of logical strips is correspondingly adjusted, according to the principle that a logical strip should be set to be as large as possible for a writing operation, to a size of 32 KB, as shown in the figure. Assume that an average size of data to be written is 8 KB and the data is written four times. If each logical strip is set to be relatively small, for example, 16 KB, two channels are enabled for each writing operation. Since original data in the destination block is erased before writing new data to a flash memory chip of each channel, the erasing operation for the block is performed twice during each writing operation. In addition, the erasing operation is the most time-consuming operation for a flash memory device, so the efficiency of the writing operation is greatly reduced and the consumption of the flash memory device is increased. A size of each logical block can be set by the user according to the embodiment of the present disclosure. If the logical strip is relatively appropriately set to be, for example, 32 KB, four channels may be enabled simultaneously with each corresponding to an 8 KB writing operation. Only a flash memory chip of one channel may perform one 8 KB writing operation to complete the writing operation, and one flash memory chip is only erased once. Therefore, the efficiency of each writing operation is increased, and the interface rate is increased. At the same time, the consumption of the flash memory chip is reduced to effectively prolong the life span of the device.

The present disclosure is illustratively described above by the above embodiments. In addition, the present disclosure has many implementations with a main purpose of providing the concept of logical strips and setting a size of a logical strip of the flash memory device by users, so as to increase the speed and efficiency of reading and writing operations of the flash memory device, and prolong the operating life span of the flash memory device. The present disclosure uses an embodiment for illustration, and it is apparent to those skilled in the art that the present disclosure also has other implementations which are under the principle of the present disclosure.

In addition, the storage device provided in the present disclosure includes, but not limited to, a flash memory device such as NAND and NOR, and other storage devices to have similar organizations of logical strips all fall within the principle and scope of the present disclosure, which are apparent to those skilled in the art and is within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A control method for logical strips based on a multi-channel solid-state non-volatile storage device, comprising:
    Step 1: dividing a storage space of each of a plurality of channels into a plurality of storage units of equal size;
    Step 2: setting at least one logical strip by which the storage units with discrete physical addresses across the plurality of channels are organized into a continuous logical space, and setting a logical strip variable, wherein the logical strip variable corresponds to at least one of a number of storage units in each channel which are logically connected in a logical strip or corresponds to a size of each logical strip; and
    Step 3: during data interaction, dividing the data according to the size of each logical strip, mapping the divided data to the storage units of every channel, and performing reading/writing operations parallel among the plurality of channels,
    wherein the logical strip variable is set into a plurality of ranks from large to small according to a value of the logical strip variable, and
    changing a rank of the logical strip variable according to data read and write operation frequencies to adjust the size of each logical strip.

2. The control method for logical strips based on a multi-channel solid-state non-volatile storage device as claimed in claim 1, wherein each storage unit corresponds to a logical strip variable.

3. The control method for logical strips based on a multi-channel solid-state non-volatile storage device as claimed in claim 1, wherein the storage unit is a sector, a page, or a byte.

4. The control method for logical strips based on a multi-channel solid-state non-volatile storage device as claimed in claim 3, wherein when the storage unit is a page, the method further comprises storing the logical strip variable in a redundant information area.

5. The control method for logical strips based on a multi-channel solid-state non-volatile storage device as claimed in claim 1, wherein the multi-channel solid-state non-volatile storage device comprises a flash memory device.

6. The control method for logical strips based on a multi-channel solid-state non-volatile storage device as claimed in claim 1, wherein the logical strip variable is collectively stored in a designated position of a reserved information area of the storage device.

7. The control method for logical strips based on a multi-channel solid-state non-volatile storage device as claimed in claim 1, wherein when the logical strip variable of a logical strip is to be adjusted, the method further comprises performing a backup for existing data stored in the storage device.

8. The control method for logical strips based on a multi-channel solid-state non-volatile storage device as claimed in claim 1, before Step 1, further comprising: dividing the storage device into a plurality of logical partitions, and performing a reading/writing control on each logical partition according to Steps 1, 2, and 3.

* * * * *